Aug. 18, 1925.

R. RUMMLER 1,550,326

DRIVE MECHANISM FOR CALCULATING MACHINES

Filed March 5, 1924    3 Sheets-Sheet 1

Inventor:
Rudow Rummler

Aug. 18, 1925. 1,550,326
R. RUMMLER
DRIVE MECHANISM FOR CALCULATING MACHINES
Filed March 5, 1924 3 Sheets-Sheet 2
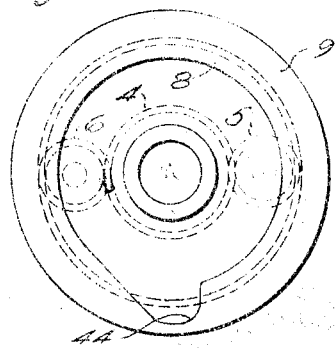
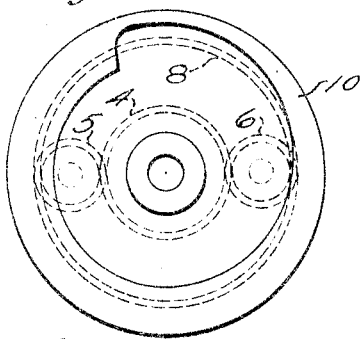
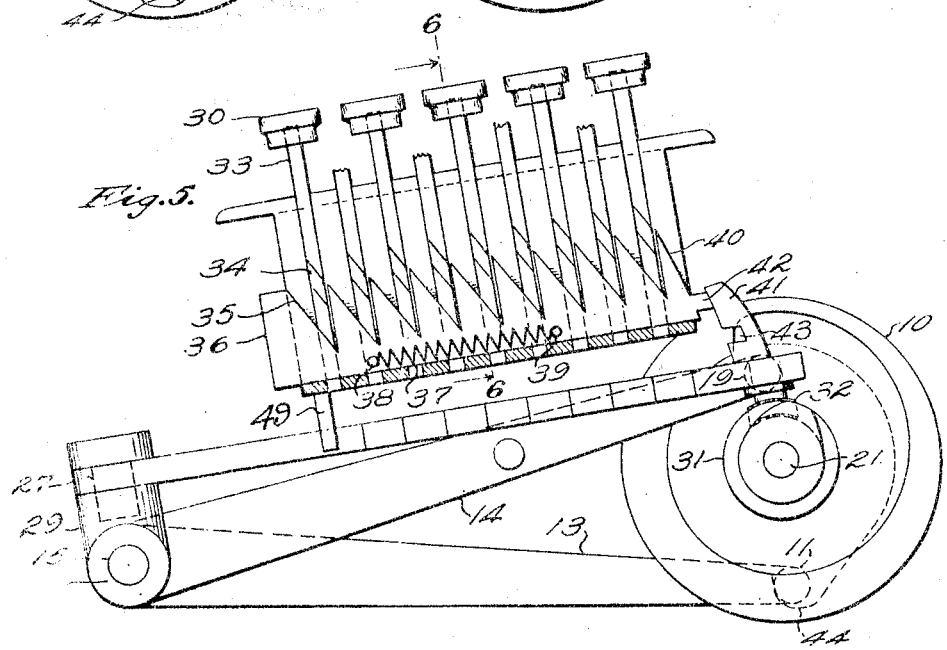
Inventor:
Rudow Rummler

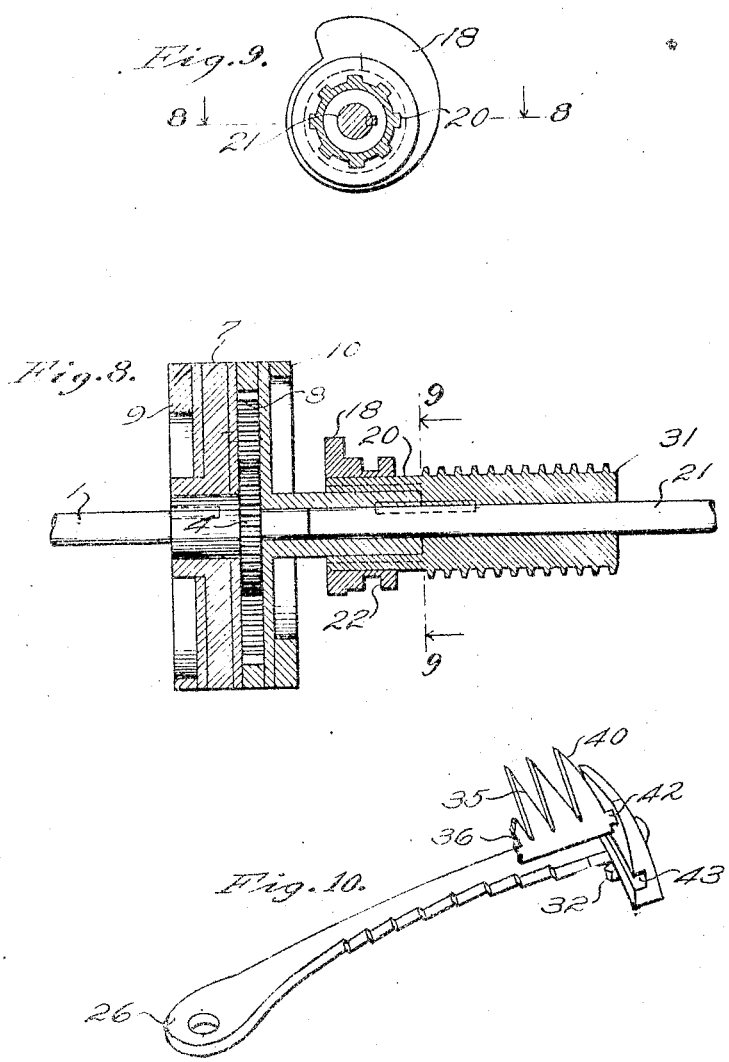

Patented Aug. 18, 1925.

1,550,326

UNITED STATES PATENT OFFICE.

RUDOW RUMMLER, OF WILMETTE, ILLINOIS.

DRIVE MECHANISM FOR CALCULATING MACHINES.

Application filed March 5, 1924. Serial No. 696,961.

*To all whom it may concern:*

Be it known that I, RUDOW RUMMLER, a citizen of the United States of America, and a resident of Wilmette, in the county of Cook and State of Illinois, have invented a new and useful Improvement in Drive Mechanisms for Calculating Machines, of which the following is a specification.

This invention relates to improvements in drive mechanisms of the nature described in my application for Patent No. 684,627, filed January 5, 1924. The purpose of the invention is to make the mechanism more completely automatic in operation whereby the keys are relieved of any work other than merely serving to release the mechanism while also serving their usual function of determining the number of revolutions imparted to the drive shaft of the machine.

It is customary in drive mechanisms for accounting, calculating machines and cash registers wherein the motor may or may not be continuously operating, to employ a clutch for coupling the motor shaft with the drive shaft of the machine. In the present case, in place of the well-known forms of clutches, a differential gear is utilized to function not only as a clutch but also as a machine stop, and to determine definitely the number of rotations imparted to the drive shaft of the machine. The action of the differential gearing is regulated by key-controlled latch mechanism so arranged that while the latch mechanism normally locks the machine proper against operation, the latch may be automatically shifted to release the machine and at the same time stop the idle running part of the differential gearing. When the normally idly running part of the differential gearing is stopped, this part of the gearing then serves as an abutment around which the machine driving part of the gearing then revolves. At the end of the operation the machine driving part of the gearing is stopped after any desired extent of operation while the idle part of the gearing is again released.

While a primary purpose of the invention is the provision of means easily and instantly controlled for imparting not only the usual single revolution to the drive shaft, but any different desired number of continuously repeated operations of the drive shaft, the key action is improved and the time of operation is reduced, when more or less extended multiplying or dividing operations are performed.

The controlling means for the differential gearing as herein described and to which this application for patent is directed, comprises means for simultaneously releasing and stopping opposite parts of the gearing, this stopping and releasing mechanism receiving power from a driven worm or other toothed or threaded element. In the arrangement shown in the drawing, the worm is keyed to the driven shaft and operates to restore to normal position a controller for the differential gear latch. The controller is in the form of a key-released member which travels along the worm upon depression of the key until stopped by the depressed key. This member then moves into engagement with the worm and at the same time the differential gear latch is shifted and the worm is driven, causing the key-controlled member to return to its normal position, and restore the differential gear latch when coming to rest during the last revolution of the worm.

Of the drawings, Figure 1 is a plan view of the drive mechanism showing the keys and the casing of the machine in section.

Figs. 3 and 4 are face views of stop elements carried by the gearing.

Fig. 5 is a detail in side elevation illustrating the appearance of the mechanism when operating after a key has been depressed.

Fig. 6 is a sectional detail of the keyboard taken on the line 6—6 of Fig. 5.

Fig. 7 is a detail of an arm for shifting the operating cam for the differential gear latch.

Fig. 8 is a detail in sectional elevation of the differential gearing, stop elements carried thereby, and a worm and cam rotatable with a driven shaft.

Fig. 9 is a detail view taken on the line 9—9 of Fig. 8.

Fig. 10 is a perspective view of a stepped plate under the control of the keys and a cooperating serrated key plate partly broken away.

Figure 1:
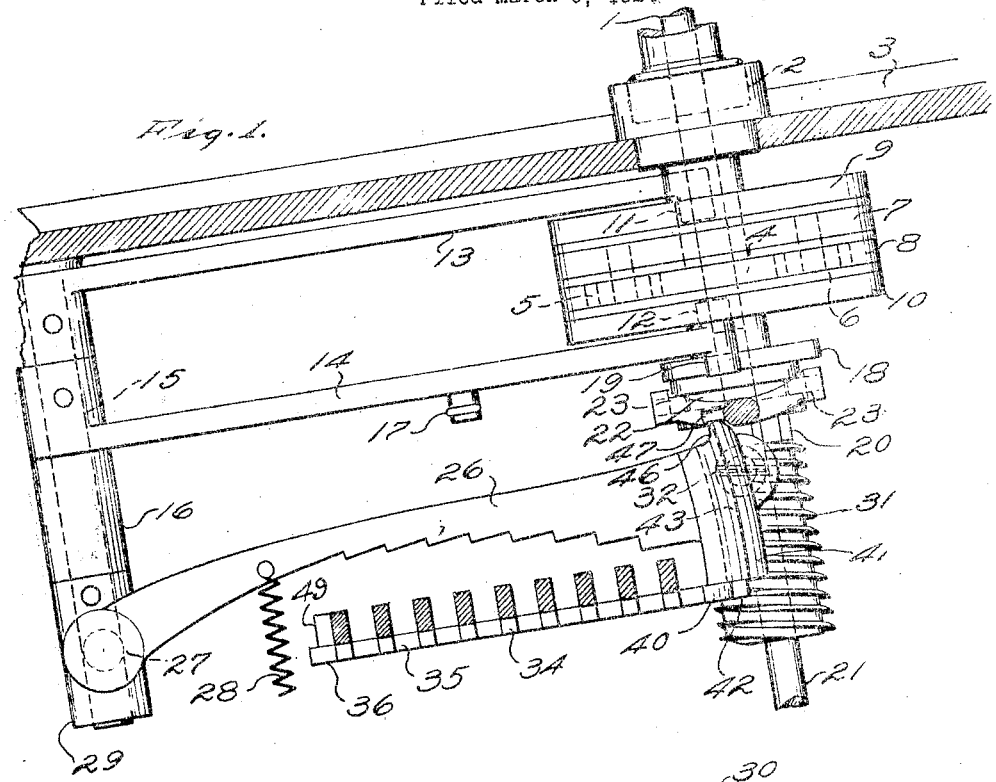

In the drawings, the motor shaft, or a shaft geared or belted to the motor, is indicated at 1. This is a short shaft passing through a ball bearing 2 in the side of the machine casing 3. At its inner end, shaft 1 carries a pinion 4. Pinion 4 meshes with a pair of pinions 5 and 6 carried by a disk 7 normally freely rotatable around shaft 1. The pinions 5 and 6 normally roll around an internal gear 8. The pinion-supporting disk 7 carries an internally recessed stop element 9, and the internal gear 8 is fast to an internally recessed stop element 10. The stops 9 and 10 are formed to cooperate with shoulders or rollers 11 and 12 on arms 13 and 14 secured to a rocker shaft 15, one of the bearings of which is indicated at 16. The arms 13 and 14 are normally held in their upper position against the action of a spring 17 by a snail cam 18. The high part of cam 18 normally engages a shoulder or roller 19 on arm 14. The cam 18 is splined on a collar 20 mounted for rotation with the driven shaft 21. Thus the cam 18 may slide along the splined collar 20 from below the shoulder 19, and when this occurs spring 17 rocks the arms 13 and 14 downwardly, stopping the element 9 and releasing the stop element 10. The pinions 5 and 6 then can no longer idly revolve around the internal gear 8 but remain in fixed position transmitting motion from the gear 4 to the internal gear 8. The internal gear 8 is secured to the driven shaft 21.

In order to shift the cam 18 along the splined collar 20, the hub of the cam is provided with a groove 22 into which extend pins 23 of a cam shifting arm 24 pivotally supported at its upper end on a bearing member 25 projecting from the lower surface of casing 3. A spring 26', Fig. 7, as regulated by a small light dash pot and pressure from shoulder 19 on the cam, urges the cam out of engagement with the shoulder but is normally prevented from performing this operation until a key is depressed.

The keys control the movement of a stepped plate 26 movable around a pivot 27 under the action of spring 28. This plate is mounted on a collar 29 fast to shaft 15, and while plate 26 is compelled to rock with the shaft 15 and the latch arms 13 and 14, it has an independent motion around the axis of its pivot 27. The extent of motion of the stepped plate 26 around pivot 27 is controlled by a manipulative device such as a keyboard comprising keys 30. The return motion of plate 26 is effected by a worm 31 fast to the driven shaft 21 and cooperating with a toothed member 32 carried by the plate, and preferably threaded to the plate to allow for adjustment and limited swivel motion.

The stems 33 of keys 30 are provided with laterally extending beveled lugs 34. Lugs 34 coact with the edges 35 of a serrated plate 36. When a key is depressed, lugs 34 serve to shift the plate 36 forwardly, Figs. 2 and 5, against the action of a light spring 37 extended between the pin 38 on plate 6 and a pin 39 on the key-supporting frame. The rear curved edge 40 of plate 36 by engaging a curved upright 41 on the rear end of the stepped plate 26, holds the stepped plate in the position indicated in Figure 1. When a key is depressed, plate 36 first shifts forwardly far enough to bring its rear edge 40 out of the path of the member 41, thus permitting plate 26 to swing around its pivot 27 under the action of spring 28 until stopped by the depressed key.

Figure 2:
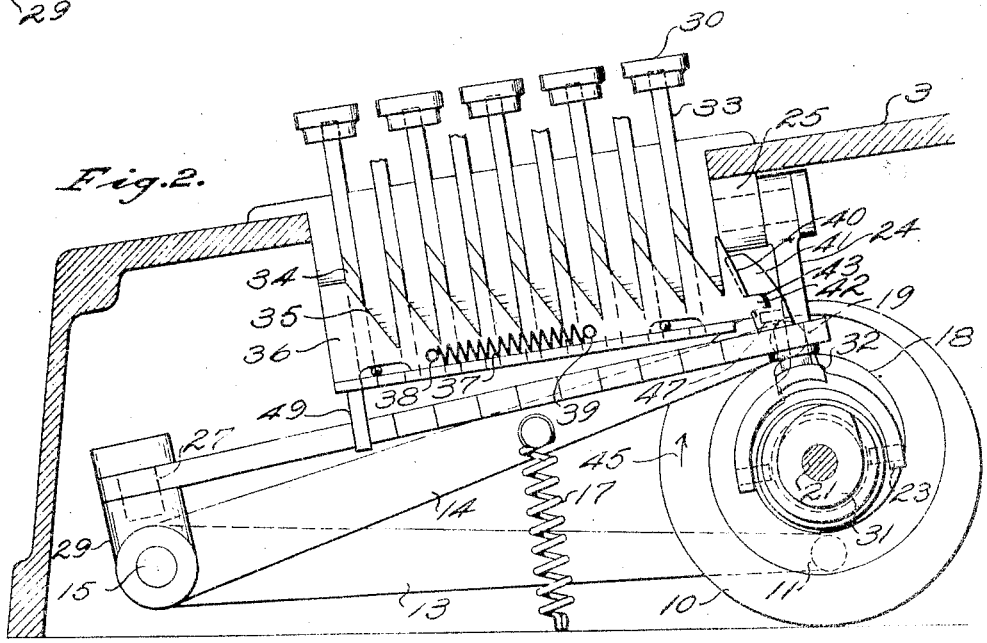
Fig. 2 is a side elevation of the drive mechanism with the casing shown in section.

When the key arrives at its fully depressed position a lug 42 extending from the rear edge of plate 36 passes out of a horizontal groove 43 in the member 41. The member 41 and its support 26 are then free to rock downwardly causing the worm wheel tooth 32 swiveled to the plate, to engage worm 31. Arms 13 and 14 move downwardly with the stepped member 26 causing the shoulder 12 to release stop plate 10 fast to the internal gear 8, and shoulder 11 to engage the recess 44 in stop plate 9. The downward movement of arms 13, 14 and 26, all of which are mounted on the rocker shaft 15, is effected by spring 17. When plate 9 is latched, the pinions 5 and 6 can no longer roll along the internal gear 8 because the studs, upon which pinions 5 and 6 turn, are carried by the disk 7 rigid with the stop plate 9. The pinions being free to rotate upon their axes, transmit motion from the motor shaft pinion 4 to the internal gear 8, driving this gear and the shaft 21 to which it is secured, in the direction indicated by arrow 45, Fig. 2. Worm 31, having a single left-hand thread, for each rotation of shaft 21, shifts the stepped arm 26 back toward its normal position as shown in Figure 1, according to the lead of the thread. During the first half of the last revolution, a shoulder 46 on the stepped member 26 engages a pin 47 on the cam-shifting yoke 24, rocking this yoke over far enough to bring the low part of cam 18 under shoulder 19. During the second half of the last revolution, the cam 18 lifts the arm 14, and through the shaft 15, the arms 13 and 26 back to their original position, thus again locking the stop disk 10 and releasing stop disk 9. The motor then again merely runs idle, pinions 5 and 6 being free to roll upon the internal gear 8

In the operation of the drive mechanism, any key may be freely depressed without encountering any other resistance than that of the individual key-restoring springs and the slight resistance of the serrated plate 36 in moving it away from the shoulder 41 against the action of spring 37. The release of the stepped member 26 and engagement thereof with the stem of the depressed key, is instantaneous, that is, it is as rapid as the depression of the key but the action of yoke 24 in shifting cam 18 away from shoulder 19 on arm 14 is not quite so rapid because of the employment of a dash pot 48 for controlling its rate of movement.

When the cam 18 is clear of shoulder 19, and the depressed key has moved far enough to cause the shoulder 42 on serrated plate 36 to move out of groove 43, arms 13, 14 and 26 may move downwardly as a unit under the action of spring 17. The tooth 32 on the member 26 engages the worm 31 at the point determined by the depressed key. As soon as the stop member 9 is locked by the shoulder 11 on arm 13, the motion of shaft 1 is transmitted through the pinions 4, 5 and 6 to the internal gear 8, thus driving shaft 21 to which the worm is keyed. The number of rotations given shaft 21 is determined by the number of rotations of worm 31 required to carry the stepped plate 26 back into engagement with pin 47 on the camshifting yoke so that this cam will be restored to operative position before the completion of the last rotation of shaft 21. During the last 180 degrees of movement of shaft 21, the cam 18 restores arms 13, 14 and 26 to their upper position. Cam 18 has a surface which is complementary to the surface of stop plate 10 carried by internal gear 8. When the stepped member 26 arrives at about its extreme position under the action of worm 31, the part 41 thereof clears the rear end of the serrated plate 36, permitting this plate to spring back to its normal position and prevent the return of the stepped member 26 until a key is again depressed.

The serrated plate 36 is not in the form of a key detent in the present design of this invention, since this particular design is intended for a class of machines where extremely rapid operation is desirable, and since the main function of the keys are merely to momentarily act as stops for the differentially movable member 26. While this member is being engaged with the worm, the keys may after a depression, follow the operator's finger as he relieves the pressure on the key. Full stroke devices for the keys, or other customary expedients for preventing undesired manipulation of the keyboard, are dispensed with, and, therefore, two or more keys may be simultaneously depressed, or a key may be depressed only far enough to disengage the curved surface 40 of the serrated plate 36 from the part 41 of the step member 26 but not far enough to withdraw the lug 42 from the groove 43 in the member 41. If a plurality of keys are depressed at the same time, shaft 21 will be driven according to the value of the lowest key. If a key is not depressed far enough to cause the lug 42 to move out of the groove 43 the stepped member 26 may swing over as far as the nine key, a stop 49 being located adjacent the nine key for this purpose. Then the mechanism may be restored to operative position by fully depressing the nine key, which will result in disengaging shoulder 42 from the groove 43 and allowing the operation of the latch mechanism.

While the latch arms 13 and 14 are shown as pivoted elements, these members could be caused to reciprocate into and out of latching position, and likewise, the number 26 might have a differential linear movement along the worm 31, in which case the keys would be arranged parallel to the axis of the worm.

Although but one specific embodiment of this invention has been herein shown and described, it will be understood that numerous details of the construction shown may be altered or omitted without departing from the spirit of this invention as defined by the following claims.

I claim:

1. A mechanism of the class described, comprising a driving shaft and a driven shaft, differential gearing connecting said shafts in a manner whereby part of the differential gearing may be idly driven or an element thereof stopped in order to clutch the driven shaft to the driving shaft, means for controlling the differential gearing for the purpose of effecting a drive relation between the two shafts, said means including a normally inoperative element and a manipulative device arranged to release the said normally inoperative element and permit it to move into operative position, said normally inoperative element being differentially movable as controlled by said manipulative device.

2. A mechanism of the class described, comprising a driving shaft and a driven shaft, differential gearing connecting said shafts in a manner whereby part of the differential gearing may be idly driven or an element thereof stopped in order to clutch the driven shaft to the driving shaft, means for controlling the differential gearing for the purpose of effecting a drive relation between the two shafts, said means including a normally inoperative element and a manipulative device arranged to release the said normally inoperative element and permit it to move into operative position, and driven means for restoring said element to its normal position.

3. A mechanism of the class described, comprising a driving shaft and a driven shaft, differential gearing connecting said shafts in a manner whereby part of the differential gearing may be idly driven or an element thereof stopped in order to clutch the driven shaft to the driving shaft, means for controlling the differential gearing for the purpose of effecting a drive relation between the two shafts, said means including a normally inoperative element and a manipulative device arranged to release the said normally inoperative element and permit it to move into operative position, driven means for restoring said element to its normal position, and a cam arranged to be automatically shifted into and out of operative relation with said means for controlling the differential gearing.

4. A drive mechanism of the class described, including a drive shaft and a driven shaft, planetary gearing connecting said shafts, means for controlling said planetary gearing to effect a driving relation between said shafts for different predetermined amounts, said means comprising depressible keys, a serrated plate movable member under the action of said keys, a differentially movable member arranged to be released by the motion of said serrated plate, a driven worm for restoring said differentially movable member, a cam, a latch for the planetary gearing, said cam being shiftable into and out of engagement with said latch, and said differentially movable member being arranged to control the shifting of said cam.

5. A drive mechanism of the class described, including a drive shaft and a driven shaft, planetary gearing connecting said shafts, means for controlling said planetary gearing to effect a driving relation between said shafts for different predetermined amounts, said means comprising depressable keys, a serrated plate movable under the action of said keys, a differentially movable member arranged to be released by the motion of said serrated plate, a driven worm for restoring said differentially movable member, a cam rotatable with said worm, a latch for the planetary gearing, said cam being shiftable into and out of engagement with said latch, and said differentially movable member being arranged to control the shifting of said cam.

6. A drive mechanism of the class described, including a drive shaft and a driven shaft planetary gearing connecting said shafts, means for controlling said planetary gearing to effect a driving relation between said shafts for different predetermined amounts, said means comprising depressable keys, a differentially movable spring operated member arranged to be released and controlled in its movements by said keys, and means for positively restoring said differentially movable member.

7. A drive mechanism of the class described, including a drive shaft and a driven shaft, planetary gearing connecting said shafts, means for controlling said planetary gearing to effect a driving relation between said shafts for different predetermined amounts, said means comprising depressable keys, a stepped differentially movable member, means for causing said member to move into engagement with a depressed key, means for restoring said differentially movable member after it has engaged a depressed key, and a latch for the planetary gearing, said differentially movable member being arranged to control the operation of said clutch.

8. A mechanism of the class described, comprising driving and driven shafts, planetary gearing connecting said shafts, means for stopping an element of said planetary gearing whereby it is rendered effective for transmitting motion between said shafts, a cam for operating said means, said cam being splined to one of said shafts, and means for shifting said cam along the shaft to which it is splined to render the cam operative and inoperative during predetermined extents of operation of said planetary gearing.

9. A mechanism of the class described, comprising driving and driven shafts, planetary gearing connecting said shafts, means for stopping an element of said planetary gearing whereby it is rendered effective for transmitting motion between said shafts, said means including a manually operable device, and a spring operated differentially movable element, a detent for said differentially movable element, said manually operable device controlling the operation of said detent and the extent of movement of said differentially movable element.

Signed at Chicago this 3rd day of March 1924.

RUDOW RUMMLER.